(12) United States Patent
Komatsu et al.

(10) Patent No.: US 6,876,142 B2
(45) Date of Patent: Apr. 5, 2005

(54) FACEPLATE HAVING SPECIFIC PHOSPHOR

(75) Inventors: Masaaki Komatsu, Kokubunji (JP); Masatoshi Shiiki, Musashimurayama (JP); Ryo Inoue, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 10/347,310

(22) Filed: Jan. 21, 2003

(65) Prior Publication Data

US 2004/0007960 A1 Jan. 15, 2004

(30) Foreign Application Priority Data

Jul. 10, 2002 (JP) ........................................ 2002-200896

(51) Int. Cl.[7] ................................................. H01J 1/62
(52) U.S. Cl. ........................ 313/495; 313/467; 313/486
(58) Field of Search ................................. 313/495, 467, 313/586

(56) References Cited

FOREIGN PATENT DOCUMENTS

| JP | 8-127769 | 6/1995 |
| JP | 11-185673 | 12/1997 |
| JP | 2000-96046 | 9/1998 |
| JP | 11-241063 | 12/1998 |

OTHER PUBLICATIONS

Kazuo Kajiwara, "Deterioration Mechanism of Luminescence Efficiency of ZnS–type Phosphors in FEDs, " Proceedings of the 289th Phosphor Research Soc. No. 31 (2001), pp. 31–38.

*Primary Examiner*—Vip Patel
(74) *Attorney, Agent, or Firm*—Reed Smith LLP; Stanley P. FIsher, Esq.; Juan Carlos A. Marquez, Esq.

(57) ABSTRACT

The present invention relates to a field-emission display having a faceplate formed with a phosphor layer and means irradiating an electron beam onto the phosphor layer in order to improve the characteristic of life of the device. The feature of the present invention is in the structure of a phosphor layer. The phosphor layer is expressed by a general formula: ZnS: M, Al where M is an activator of at least one of Cu, Ag and Au; and Al is a coactivator, in which the concentration of Al is higher than that of M. According to the present invention, the electrification characteristic of the phosphor is improved for lower resistance. The defect concentration of the surface of the phosphor is reduced. The filed-emission display which can realize improvement in the characteristic of life which has not been solved in the prior art can be made.

9 Claims, 5 Drawing Sheets

FACEPLATE HAVING SPECIFIC PHOSPHOR

BACKGROUND OF THE INVENTION AND RELATED ART STATEMENT

The present invention relates to a field-emission display having a faceplate formed with a phosphor layer and means irradiating an electron beam onto the phosphor layer. More specifically, the present invention relates to a display suitable for a field-emission display (hereinafter, called an FED) using a ZnS phosphor.

Various displays are being studied and developed increasingly in image information systems corresponding to various requests of a higher resolution, a larger screen, a thinner type and lower power consumption. Displays using a Braun tube have been used widely. Making them thinner is limited.

In recent years, FEDs have been studied and developed more and more as a display which can realize a thinner type and lower power consumption responding to such requests. In the FED, a plane-shaped field-emission type electron source is disposed on the back surface of an enclosed vacuum box and a phosphor layer is provided in the inner surface of a front faceplate. An electron beam of low accelerating voltage of about 0.1 to 10 kV is irradiated onto the phosphor layer for emission to display an image.

The electron density of the electron beam irradiated onto the phosphor layer is a high electron density as about 10 to 1000 times that of a typical Braun tube. In the phosphor layer for the FED, a low resistance characteristic which causes saturation with electric charge is desired. Further, a good characteristic of life under a high electron density and a high brightness characteristic are required.

To realize the lower resistance, longer life and higher brightness of the phosphor layer, various developments have been made. As a method for improving the performance of the phosphor layer for the FED using a ZnS phosphor, as described in Japanese Laid-Open No. 2000-96046, there is a method in which a mixed phosphor of a sulfide system phosphor and an oxide system phosphor as an yttrium, aluminum oxide system or a silicate system phosphor is provided to offer a good luminescent maintenance factor with time.

As described in Japanese Laid-Open No. 8-127769, there is a method in which a ZnO layer is provided on a sulfide system phosphor layer or ZnO is coated onto the surface of a phosphor particle so as to eliminate sulfur splash, obtaining a high brightness.

As described in Japanese Laid-Open No. 11-241063, there is a method in which a Zn powder metal is added to a ZnS or (ZnCd) S system phosphor to prevent the phosphor from being oxidized, thereby reducing surface charge to improve brightness.

As a method performing for high quality image display by contriving the construction of the FED, as described in Japanese Laid-Open No. 11-185673, there is a method for preventing scattering of an electron beam reflected on a phosphor layer by a black matrix formed to be projected from the emitting surface of the phosphor layer.

As a method related to added concentration of a radiative recombination center device of a ZnS phosphor, as described in Asia Display/IDW' 01 Proceedings, FED 1-2, 1157, there is a method for improving luminescent deterioration by increasing Al and Cu concentration at an [Al]/[Cu] molar ratio around 1.0.

As described in Proceedings of the 289$^{th}$ Phosphor Research Soc. No. 31, pp. 31–38 (2001), there is a method for improving luminescent deterioration using P55 type ZnS: Ag, Al phosphor ([Al]/[Ag] molar ratio=1.06) for a projection CRT having a low initial defect concentration on a phosphor surface.

These are reports in which the [Al]/[Cu] molar ratio (the former) and the [Al]/[Ag] molar ratio (the latter) are around 1.0. A concentration range in which a molar ratio is higher than that is not described.

To realize the lower resistance, longer life and higher brightness of the phosphor layer for FED, various methods have been studied. The prior art methods have not solved all the problems. A new method for lowering the surface resistance of a phosphor to achieve a longer life is required.

OBJECT AND SUMMARY OF THE INVENTION

An object of the present invention is to provide a field-emission display which can realize the lower resistance of the phosphor layer of the prior art and has an excellent characteristic by improving a characteristic of life of the phosphor layer.

The above object can be achieved by a field-emission display having a faceplate formed with a phosphor layer and means irradiating an electron beam onto the phosphor layer, wherein the phosphor layer consists of a phosphor in which a surface electrification characteristic is a positive charge.

The phosphor of the phosphor layer in which a surface electrification characteristic is a positive charge is achieved by a display, wherein a phosphor layer consists of a phosphor which is expressed by a general formula: ZnS: M, Al where M is an activator of at least one of Cu, Ag and Au in which the concentration of the coactivator Al is higher than that of the activator M.

As a first aspect of the phosphor layer used in the display forming the field-emission display of the present invention, the molar concentration [Al] of Al added as a donor to a ZnS phosphor is higher than the molar concentration [M] of M added as an acceptor. The electrification characteristic of the phosphor becomes a positive charge. Penetration of an electron into the phosphor is easier at electron beam irradiation. The saturation with electric charge is suppressed to realize the lower resistance of the phosphor.

As a second aspect, the molar concentration [Al] of Al is higher than the molar concentration [M] of M. The surface defect related to the acceptor is reduced to realize the phosphor having an excellent characteristic of life.

When using a blue-emitting phosphor, the phosphor layer is formed by a phosphor which is expressed by a general formula: ZnS: Ag, Al in which the molar concentration ratio x=[Al]/[Ag] of Al and Ag is $1.2 \leq x$. The performance of the phosphor layer is improved.

The phosphor layer consists of a phosphor in which the defect peak of 320K of a thermal glow curve measured at a temperature rise of 0.1K/sec by excitation with a vacuum ultraviolet light of 168 nm is small and the molar concentration ratio x=[Al]/[Ag] of Al and Ag is $2.0 \leq x$. The performance of the phosphor layer is improved.

The phosphor layer consists of a phosphor in which the volume increase of an Ag atom is volume compensated by an Al atom, the excess and shortage of the atomic volume is smaller than 0, and the molar concentration ratio x=[Al]/[Ag] of Al and Ag is $4.5 < x$. The performance of the phosphor layer is improved.

A light-transmitting conductive material such as $In_2O_3$, MgO and $SnO_2$ is mixed into the phosphor layer. The lower resistance can be provided to improve the performance of the phosphor layer. A layer of a light-transmitting conductive material may be formed on the surface of the phosphor layer. The surface of the phosphor particle may be coated by the light-transmitting conductive material.

Figure 1:
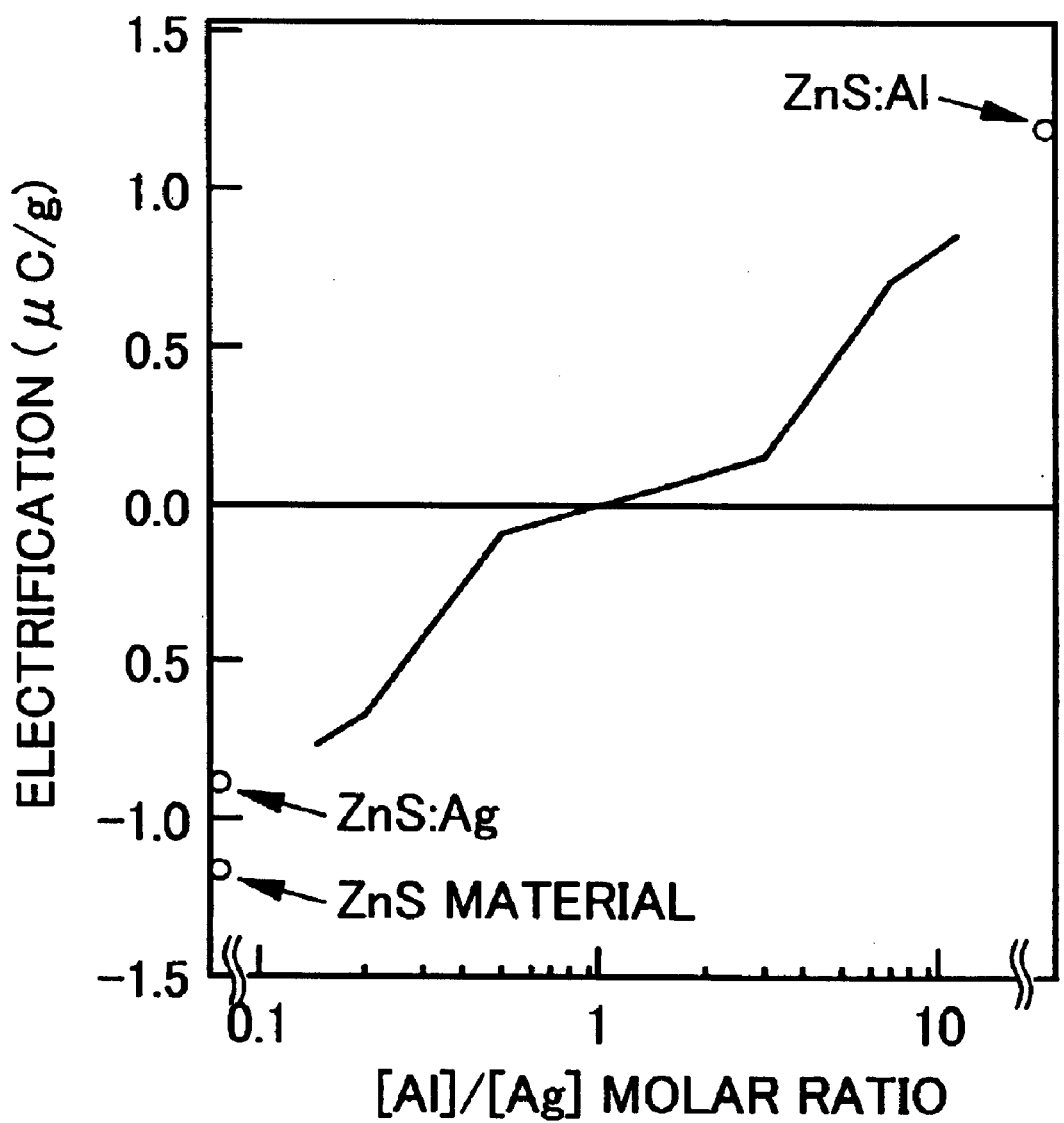
FIG. 1 is a graph showing an electrification characteristic of a phosphor of the present invention.

The reference numerals of the drawings are as follows:

1 Display with MIM type electron source
2 Faceplate
3 MIM type electron source
4 Rear plate
5 Lower part electrode
6 Insulator layer
7 Upper part electrode
8 Phosphor layer
9 Display with FED type electron source
10 FED type electron source
11 Cathode
12 Resistance layer
13 Insulator layer
14 Gate
15 Spindt type electron emitter
16 Black conductive material

DETAILED DESCRIPTION OF PREFERRED EMBODIMENTS

A method for manufacturing a phosphor used in a display forming a field-emission display of the present invention, and the electrification characteristic, the surface defect concentration and the characteristic of life of the phosphor layer will be described here in detail. Embodiments described below show an example embodying the present invention and do not constrain the present invention.

(First Embodiment)

A ZnS: Ag, Al phosphor used in the present invention can be manufactured by the method described below. ZnS (zinc sulfide raw powder) is used as a raw host material. As Ag used as an activator, $AgNO_3$ is dissolved into pure water to prepare a $10^{-4}$ mol/ml solution, which is then added in a predetermined amount. As Al used as a coactivator, $Al(NO_3)_3 \cdot 9H_2O$ is dissolved into pure water to prepare a $10^{-4}$ mol/ml solution, which is then added in a predetermined amount.

The quantities of the respective raw materials of the ZnS: Ag, Al phosphor (Ag=500 weight ppm, Al=250 weight ppm, and [Al]/[Ag] molar ratio x=2.0) are as follows:

| zinc sulfide raw powder | ZnS | 9.746 g |
| silver solution | Ag | 0.451 ml |
| aluminum solution | Al | 0.903 ml |

The above raw materials are well mixed and dried.

The obtained phosphor raw material mixture is filled into a silica boat to be set into a silica tube of a tube-like synthesis furnace for calcination. After substitution of the entire product by an Ar gas, an $H_2S$ gas of 100 ml/min is flowed into the silica tube to conduct the calcination in a hydrogen sulfide atmosphere. The calcination temperature is 950° C. and the calcination time is 2 hours. The calcined product is lightly loosened for sieving, thereby obtaining the phosphor used in the present invention.

The ZnS: Ag, Al phosphor in which the Al and Ag concentrations are changed to vary the [Al]/[Ag] molar ratio x is manufactured so as to change x to be in a predetermined amount for synthesis as described above.

The electrification characteristic of the phosphor thus obtained is measured. In the measurement of the electrification characteristic, a ferrite powder is used as a carrier. The phosphor of 0.3 g is added to a ferrite powder of 9.7 g, and then, the addition is mixed in a ball mill for 30 minutes. The mixed powder of about 0.2 g is taken out to measure the phosphor electrification amount by an electrification measuring device.

FIG. 1 shows a change in the [Al]/[Ag] molar ratio of the phosphor electrification amount. The electrification amount of the ZnS material is 1.2 $\mu C/g$ and the electrification amount of ZnS: Ag synthesized without adding Al is $-0.8$ $\mu C/g$. The electrification amount of the ZnS: Ag, Al phosphor tends to be larger with increase in the [Al]/[Ag] molar ratio x. The electrification is changed from a negative charge to a positive charge around x=1.2.

The electrification amount is not 0 at an equimolar concentration (x=1.0). It is thought to be influenced by the charge due to surface defect. When the electrification is a positive charge with increase in the [Al]/[Ag] molar ratio, the electrification amount tends to be larger. The electrification amount of the ZnS: Al synthesized without adding Ag is +1.2 $\mu C/g$. The concentration range should be the [Al]/[Ag] molar ratio x of $1.2 \leq x$. The electrification characteristic of the phosphor is a positive charge. Penetration of an electron is easier. The saturation with electric charge is suppressed to realize the lower resistance of the entire phosphor layer.

The thermal glow curve of the ZnS: Ag, Al phosphor is measured. In a sample measured, water glass is added to a Ni plated copper substrate by a conventional method of sedimentation. The sample substrate onto which the phosphor is coated is set into a chamber in a vacuum of about $10^{-4}$ Pa. While a liquid nitrogen is maintained at about 80K, a vacuum ultraviolet light of 168 nm of a deuterium lamp is irradiated to excite the phosphor for 45 minutes.

Figure 2:
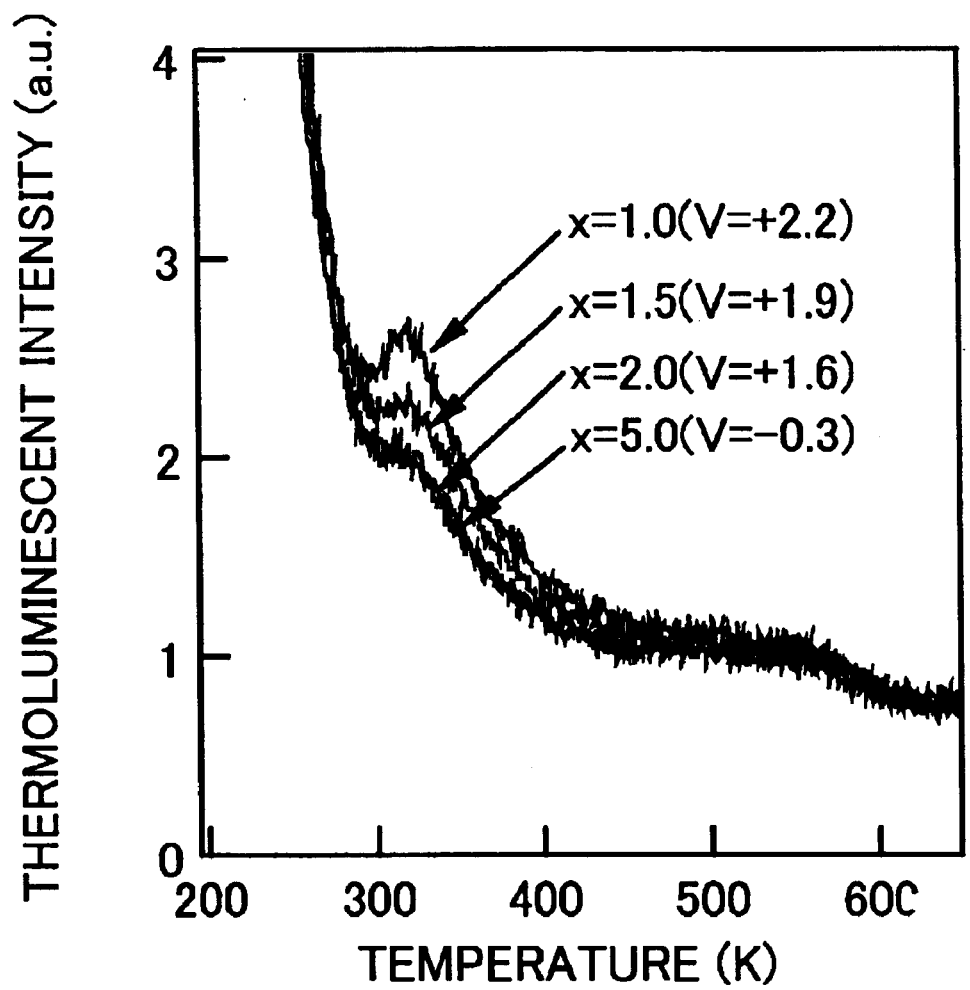
FIG. 2 is a graph showing thermal glow curves of the phosphor of the present invention.

The brightness produced while maintaining the sample temperature constant at a temperature rise of 0.1K/sec is monitored to measure the thermal glow curve. FIG. 2 shows thermal glow curves of the [Al]/[Ag] molar ratios x=1.0, 1.5, 2.0 and 5.0. At x=1.0, a thermoluminescent peak is observed around 320K. The thermoluminescent peak is reduced with increase in the [Al]/[Ag] molar ratio and has an almost constant thermoluminescent intensity at $2.0 \leq x$. This shows that the surface defect concentration is reduced with increase in the [Al]/[Ag] molar ratio.

Table 1 shows ion radii and volume ratios of Zn, Ag and Al atoms and excess and shortage of atomic volumes to Zn. The ion radius of Ag is 0.116 nm which is larger than the ion radius of 0.074 nm of Zn. The volume ratio is 3.85 times Zn. When Ag substitutes for one Zn, the volume of Ag is 2.85 times larger than that of Zn. The ion radius of Al is small as 0.053 nm. The volume ratio is 0.37 times Zn. When Al substitutes for one Zn, the volume of Al is 0.63 times smaller than that of Zn.

The case of compensating the volume excess of Ag by Al will be considered. The [Al]/[Ag] molar ratio x must be x=4.5. FIG. 2 shows excess and shortage (V) in the atomic volumes. It is found that as the Al concentration ratio is increased and the volume excess and shortage approaches V=0, the surface defect is reduced. The surface defect of the phosphor is reduced and the crystallinity is good in the concentration range in which the [Al]/[Ag] molar ratio x is $2.0 \leq x$, in particular, in the range of $4.5 \leq x$ in which the atomic volume is compensated.

TABLE 1

Ion radius, volume ratio and volume excess and shortage of atoms

| | Ion radius | Volume ratio | Volume excess and shortage |
|---|---|---|---|
| Zn | 0.074 nm | 1 | 0 |
| Ag | 0.116 nm | 3.85 | +2.85 |
| Al | 0.053 nm | 0.37 | −0.63 |

Figure 3:
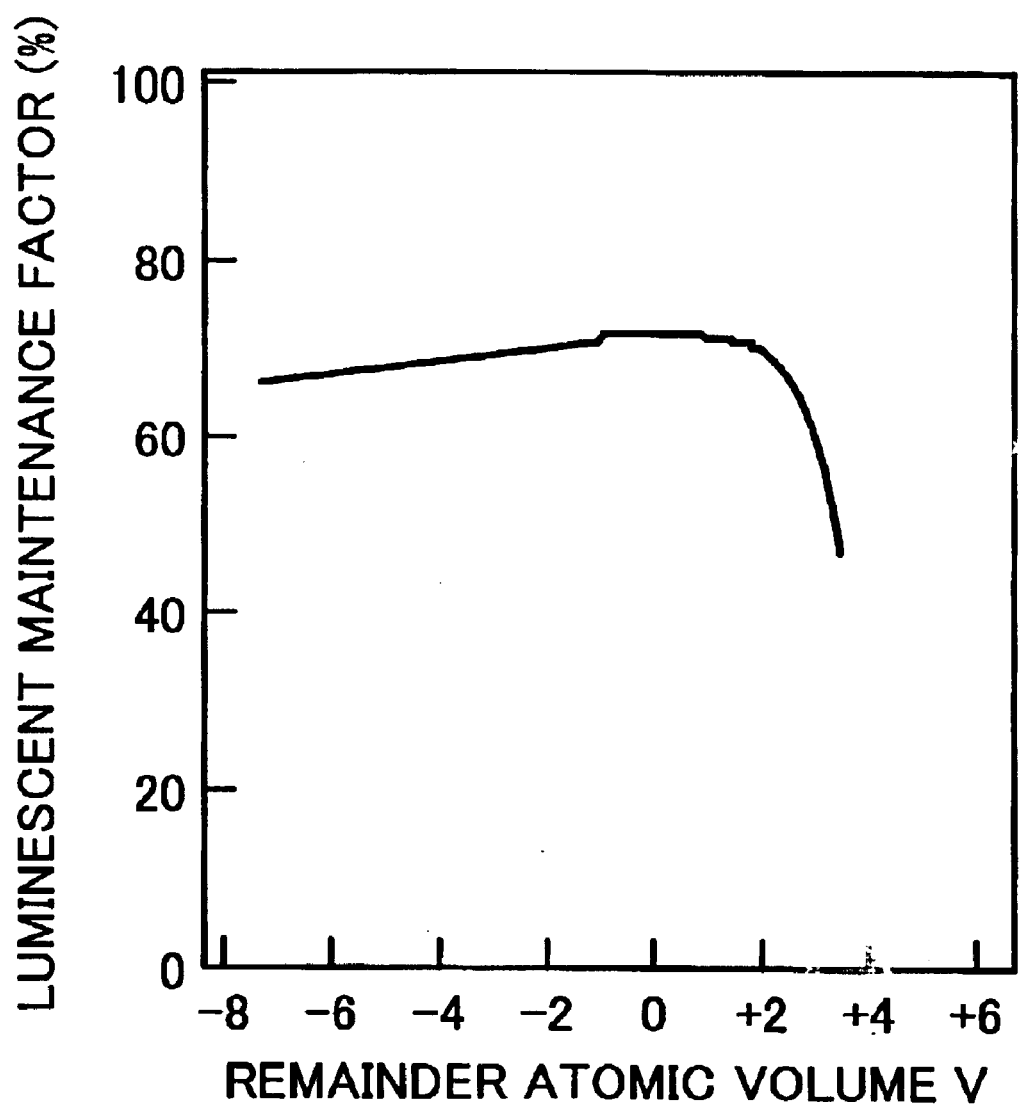
FIG. 3 is a graph showing a luminescent maintenance factor of a phosphor layer of the present invention.

For the phosphor thus obtained, in the same manner as the thermal glow curve measurement, sample substrates are manufactured to conduct luminescent maintenance factor characteristic evaluation such that a demountable type high density electron beam irradiating device is used to irradiate an electron beam for 30 minutes under the conditions of an accelerating voltage of 7 kV, an irradiating current of 469 $\mu A/cm^2$ and a sample temperature of 200° C. FIG. 3 shows change in excess and shortage of the atomic volumes of the luminescent maintenance factor after 30 minutes when the initial emission energy efficiency is expressed as 100%. The luminescent maintenance factor is good in the range in which the excess and shortage (V) of the atomic volume is $V \leq 2.0$, in particular, around V=0.

(Second Embodiment)

A ZnS: Cu, Al phosphor used in the present invention can be manufactured by the method described below. ZnS (zinc sulfide raw powder) is used as a raw host material. As Cu used as an activator, $CuSO_4 \cdot 5H_2O$ is dissolved into pure water to prepare a $10^{-4}$ mol/ml solution, which is then added in a predetermined amount.

Al used as a coactivator is added in a predetermined amount, as in First Embodiment. The quantities of the respective raw materials of the ZnS: Cu, Al phosphor (Cu=100 weight ppm, Al=170 weight ppm, and [Al]/[Cu]= 4.0) are as follows:

| zinc sulfide raw powder | ZnS | 9.746 g |
|---|---|---|
| copper solution | Cu | 0.153 ml |
| aluminum solution | Al | 0.614 ml |

The above raw materials are used for calcination and post-treatment as in First Embodiment to obtain the phosphor used in the present invention. The luminescent maintenance factor characteristic of the phosphor by electron beam irradiation is good as in First Embodiment. The same electrification characteristic as in FIG. 1 of First Embodiment is shown.

(Third Embodiment)

A ZnS: Au, Al phosphor used in the present invention can be manufactured by the method described below. ZnS (zinc sulfide raw powder) is used as a raw host material. As Au used as an activator, a gold standard solution for atomic absorption spectrometry (1.00 mg/ml) is added in a predetermined amount.

Al used as a coactivator is added in a predetermined amount, as in First Embodiment. The quantities of the respective raw materials of the ZnS: Au, Al phosphor (Au=1000 weight ppm, Al=274 weight ppm, and [Al]/[Au]= 2.0) are as follows:

| zinc sulfide raw powder | ZnS | 9.746 g |
|---|---|---|
| gold solution | Au | 9.746 ml |
| aluminum solution | Al | 0.990 ml |

The above raw materials are used for calcination and post-treatment as in First Embodiment to obtain the phosphor used in the present invention. The luminescent maintenance factor characteristic of the phosphor by electron beam irradiation is good as in First Embodiment. The same electrification characteristic as in FIG. 1 of First Embodiment is shown.

(Fourth Embodiment)

A ZnS: Cu, Ag, Al phosphor used in the present invention can be manufactured by the method described below. ZnS (zinc sulfide raw powder) is used as a raw host material. As Cu and Ag used as an activator are added in a predetermined amount, as in First and Second Embodiments.

Al used as a coactivator is added in a predetermined amount, as in First Embodiment. The quantities of the respective raw materials of the ZnS: Cu, Ag, Al phosphor (Cu=100 weight ppm, Ag=50 weight ppm, Al=200 weight ppm, and [Al]/([Cu]+[Ag])=4.0) are as follows:

| zinc sulfide raw powder | ZnS | 9.746 g |
|---|---|---|
| copper solution | Cu | 0.153 ml |
| silver solution | Ag | 0.045 ml |
| aluminum solution | Al | 0.722 ml |

The above raw materials are used for calcination and post-treatment as in First Embodiment to obtain the phosphor used in the present invention. The luminescent maintenance factor characteristic of the phosphor by electron beam irradiation is good as in First Embodiment. The same electrification characteristic as in FIG. 1 of First Embodiment is shown.

(Fifth Embodiment)

A ZnS: Cu, Au, Al phosphor used in the present invention can be manufactured by the method described below. ZnS (zinc sulfide raw powder) is used as a raw host material. As Cu and Au used as an activator are added in a predetermined amount, as in Second and Third Embodiments.

Al used as a coactivator is added in a predetermined amount, as in First Embodiment. The quantities of the respective raw materials of the ZnS: Cu, Au, Al phosphor (Cu=100 weight ppm, Au=50 weight ppm, Al=220 weight ppm, and [Al]/([Cu]+[Au])=4.0) are as follows:

| zinc sulfide raw powder | ZnS | 9.746 g |
|---|---|---|
| copper solution | Cu | 0.153 ml |
| gold solution | Au | 0.487 ml |
| aluminum solution | Al | 0.794 ml |

The above raw materials are used for calcination and post-treatment as in First Embodiment to obtain the phosphor used in the present invention. The luminescent maintenance factor characteristic of the phosphor by electron beam irradiation is good as in First Embodiment. The same electrification characteristic as in FIG. 1 of First Embodiment is shown.

(Sixth Embodiment)

A ZnS: Cu, Ag, Au, Al phosphor used in the present invention can be manufactured by the method described below. ZnS (zinc sulfide raw powder) is used as a raw host material. As Cu, Ag and Au used as an activator are added in a predetermined amount, as in First, Second and Third Embodiments.

Al used as a coactivator is added in a predetermined amount, as in First Embodiment. The quantities of the respective raw materials of the ZnS: Cu, Ag, Au, Al phosphor (Cu=100 weight ppm, Ag=50 weight ppm, Au=50 weight ppm, Al=247 weight ppm, and [Al]/([Cu]+[Ag]+[Au])=4.0) are as follows:

| zinc sulfide raw powder | ZnS | 9.746 g |
|---|---|---|
| copper solution | Cu | 0.153 ml |
| silver solution | Ag | 0.045 ml |
| gold solution | Au | 0.487 ml |
| aluminum solution | Al | 0.892 ml |

The above raw materials are used for calcination and post-treatment as in First Embodiment to obtain the phosphor used in the present invention. The luminescent maintenance factor characteristic of the phosphor by electron beam irradiation is good as in First Embodiment. The same electrification characteristic as in FIG. 1 of First Embodiment is shown.

(Seventh Embodiment)

A ZnS: Ag, Al phosphor used in the present invention can be manufactured by the method described below. ZnS (zinc sulfide raw powder) is used as a raw host material. As Al and Ag used as an activator and a coactivator are added in a predetermined amount, as in First Embodiment. The quantities of the respective raw materials of the ZnS: Ag, Al phosphor (Ag 500 weight ppm, Al=375 weight ppm, and [Al]/[Ag]=3.0) are as follows:

| zinc sulfide raw powder | ZnS | 9.746 g |
|---|---|---|
| silver solution | Ag | 0.451 ml |
| aluminum solution | Al | 1.355 ml |

The above raw materials are used for calcination and post-treatment as in First Embodiment. 4 weight % $In_2O_3$ is coated as a transparent conductive material on the surface of the obtained phosphor to provide the phosphor used in the present invention. The luminescent maintenance factor characteristic of the phosphor by electron beam irradiation is good as in First Embodiment. $In_2O_3$ is shown here as a representative example as the light-transmitting conductive material. Using MgO and $SnO_2$, the lower resistance of the phosphor layer is also observed.

EXAMPLE

The present invention will be described below by taking specific examples. Needless to say, the present invention is not limited to the examples and includes substitution of elements and design modification in the range achieving an object of the present invention.

Example 1

Display 1 with MIM Type Electron Source

Figure 4:
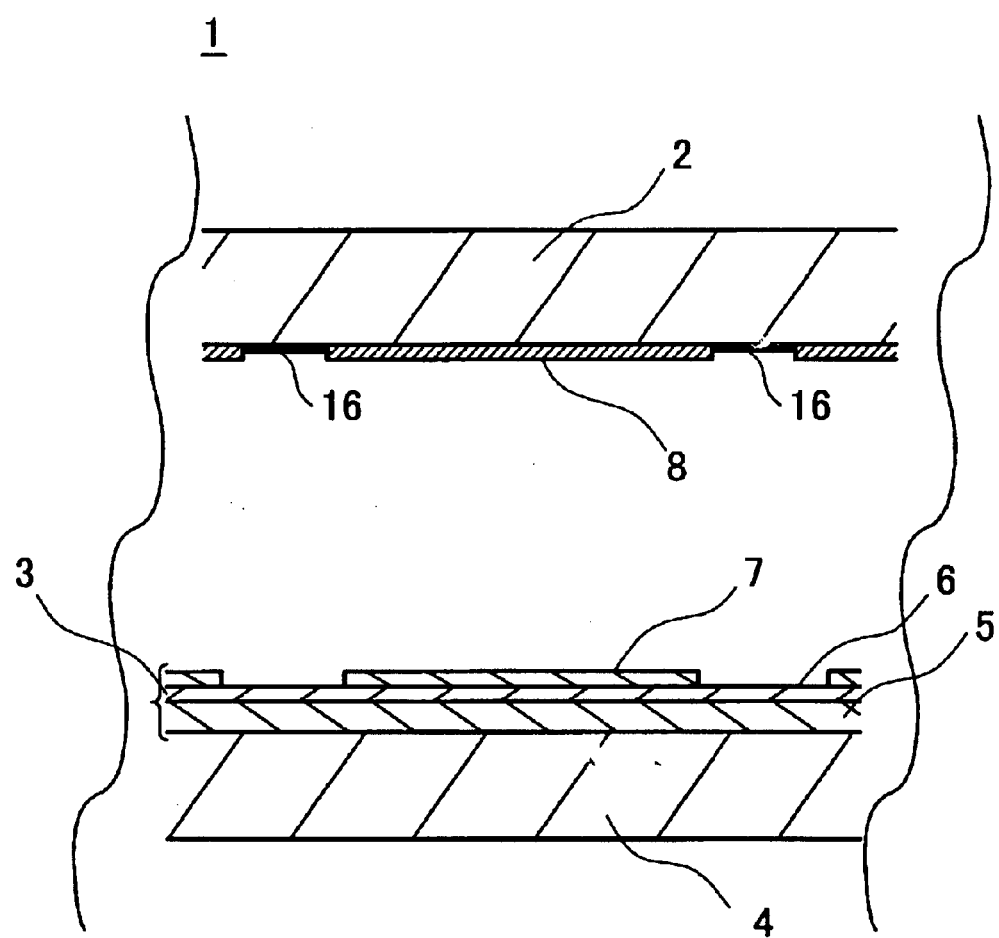
FIG. 4 is a schematic diagram showing a sectional structure of an essential part of a display with MIM type electron source of the present invention.

FIG. 4 shows a section of an essential part of a display with MIM type electron source of the present invention. MIM is an abbreviation of Metal-Insulator-Metal. A display 1 with MIM type electron source has a faceplate 2, an MIM type electron source 3 and a rear plate 4. The MIM type electron source 3 is formed by a lower part electrode (Al) 5, an insulator layer ($Al_2O_3$) 6 and an upper part electrode (Ir—Pt—Au) 7.

The faceplate 2 has, in its inside, a phosphor layer 8 onto which the ZnS: Ag, Al phosphor having the [Al]/[Ag] molar ratio x=2.0 obtained in First Embodiment is coated as a blue phosphor. To increase the resolution of the display, a black conductive material 16 is provided at one-dot interval.

To manufacture the black conductive material 16, a photoresist layer is coated onto the entire surface of the faceplate 2 to be exposed and developed via a mask and the photoresist layer is left partially. A graphite layer is formed on the entire surface, on which hydrogen peroxide acts. The photoresist layer and the graphite thereon are removed to form the black conductive material.

A slurry method is used for coating of the phosphor layer 8. The phosphor is dispersed in a mixed solution of polyvinyl alcohol and dichromic acid to prepare a slurry suspension. The suspension is coated onto the faceplate and is dried for exposure via the mask to fix the phosphor. It is spray developed in hot pure water to wash away the unexposed part of the layer to form a pattern of the phosphor.

A metal back is manufactured by subjecting the inner surface of the phosphor layer 8 to a filming process to vacuum deposit Al. It is heat treated to splash a filming agent. The phosphor layer 8 is thus completed.

In the display of the present invention, the surface electrification characteristic is a positive charge. The blue ZnS: Ag, Al phosphor having less surface defect is used to increase the brightness life by 5% as compared with the prior art.

Example 2

Display 2 with MIM Type Electron Source

FIG. 4 shows a section of an essential part of a display with MIM type electron source of the present invention. The faceplate 2 has, in its inside, the phosphor layer 8 onto which the ZnS: Ag, Al phosphor having the [Al]/[Ag] molar ratio x=1.2 obtained in First Embodiment is coated as a blue phosphor.

The methods for forming the black conductive material 16, the phosphor layer 8 and the metal back are the same as Example 1. The brightness life according to the present invention is good, as in Example 1.

Example 3

Display 3 with MIM Type Electron Source

FIG. 4 shows a section of an essential part of a display with MIM type electron source of the present invention. The faceplate 2 has, in its inside, the phosphor layer 8 onto which the ZnS: Ag, Al phosphor having the [Al]/[Ag] molar ratio x=4.5 obtained in First Embodiment is coated as a blue phosphor.

The methods for forming the black conductive material 16, the phosphor layer 8 and the metal back are the same as Example 1. The brightness life according to the present invention is good, as in Example 1.

Example 4

Display 4 with MIM Type Electron Source

FIG. 4 shows a section of an essential part of a display with MIM type electron source of the present invention. The faceplate 2 has, in its inside, the phosphor layer 8 onto which the ZnS: Cu, Al phosphor having the [Al]/[Cu] molar ratio x=4.0 obtained in Second Embodiment is coated as a green phosphor.

The methods for forming the black conductive material 16, the phosphor layer 8 and the metal back are the same as Example 1. The brightness life according to the present invention is good, as in Example 1.

Example 5

Display 5 with MIM Type Electron Source

FIG. 4 shows a section of an essential part of a display with MIM type electron source of the present invention. The faceplate 2 has, in its inside, the phosphor layer 8 onto which the ZnS: Au, Al phosphor having the [Al]/[Au] molar ratio x=2.0 obtained in Third Embodiment is coated as a green phosphor.

The methods for forming the black conductive material 16, the phosphor layer 8 and the metal back are the same as Example 1. The brightness life according to the present invention is good, as in Example 1.

Example 6

Display 6 with MIM Type Electron Source

FIG. 4 shows a section of an essential part of a display with MIM type electron source of the present invention. The faceplate 2 has, in its inside, the phosphor layer 8 onto which the ZnS: Cu, Ag, Al phosphor having the [Al]/([Cu]+[Ag]) molar ratio x=5.0 obtained by the same method as Fourth Embodiment is coated as a green phosphor. The methods for forming the black conductive material 16, the phosphor layer 8 and the metal back are the same as Example 1. The brightness life according to the present invention is good, as in Example 1.

Example 7

Display 7 with MIM Type Electron Source

FIG. 4 shows a section of an essential part of a display with MIM type electron source of the present invention. The faceplate 2 has, in its inside, the phosphor layer 8 onto which the ZnS: Cu, Au, Al phosphor having the [Al]/([Cu]+[Au]) molar ratio x=5.0 obtained by the same method as Fifth Embodiment is coated as a green phosphor. The methods for forming the black conductive material 16, the phosphor layer 8 and the metal back are the same as Example 1. The brightness life according to the present invention is good, as in Example 1.

Example 8

Display 8 with MIM Type Electron Source

FIG. 4 shows a section of an essential part of a display with MIM type electron source of the present invention. The faceplate 2 has, in its inside, the phosphor layer 8 onto which the ZnS: Cu, Ag, Au, Al phosphor having the [Al]/([Cu]+[Ag]+[Au]) molar ratio x=5.0 obtained by the same method as Sixth Embodiment is coated as a green phosphor. The methods for forming the black conductive material 16, the phosphor layer 8 and the metal back are the same as Example 1. The brightness life according to the present invention is good, as in Example 1.

Example 9

Display 9 with MIM Type Electron Source

FIG. 4 shows a section of an essential part of a display with MIM type electron source of the present invention. The faceplate 2 has, in its inside, the phosphor layer 8 onto which the ZnS: Ag, Al phosphor having the [Al]/[Ag] molar ratio x=2.0 obtained in First Embodiment is coated as a blue phosphor, the ZnS: Cu, Al phosphor having the [Al]/[Cu] molar ratio x=4.0 obtained in Second Embodiment is coated as a green phosphor, and a $Y_2O_2S$: Eu phosphor is coated as a red phosphor.

A slurry method is used for coating of the phosphor layer 8. The phosphor is dispersed in a mixed solution of polyvinyl alcohol and dichromic acid to prepare a slurry suspension. The suspension is coated onto the faceplate and is dried for exposure via a mask to fix the phosphor. It is spray developed in hot pure water to wash away the unexposed part of the layer to form a pattern of the phosphor. The pattern forming of the phosphor layer is conducted for each of the colors. The methods for forming the black conductive material 16 and the metal back are the same as Example 1. The brightness life according to the present invention is good, as in Example 1.

Example 10

Display 10 with MIM Type Electron Source

FIG. 4 shows a section of an essential part of a display with MIM type electron source of the present invention. The faceplate 2 has, in its inside, the phosphor layer 8 onto which a phosphor in which 4 weight % $In_2O_3$ is coated onto the surface of the ZnS: Ag, Al phosphor having the [Al]/[Ag] molar ratio x=3.5 obtained in First Embodiment is coated as a blue phosphor. The methods for forming the black conductive material 16, the phosphor layer 8 and the metal back are the same as Example 1. The brightness life according to the present invention is good, as in Example 1.

Example 11

Display 1 with Spindt Type Electron Source

Figure 5:
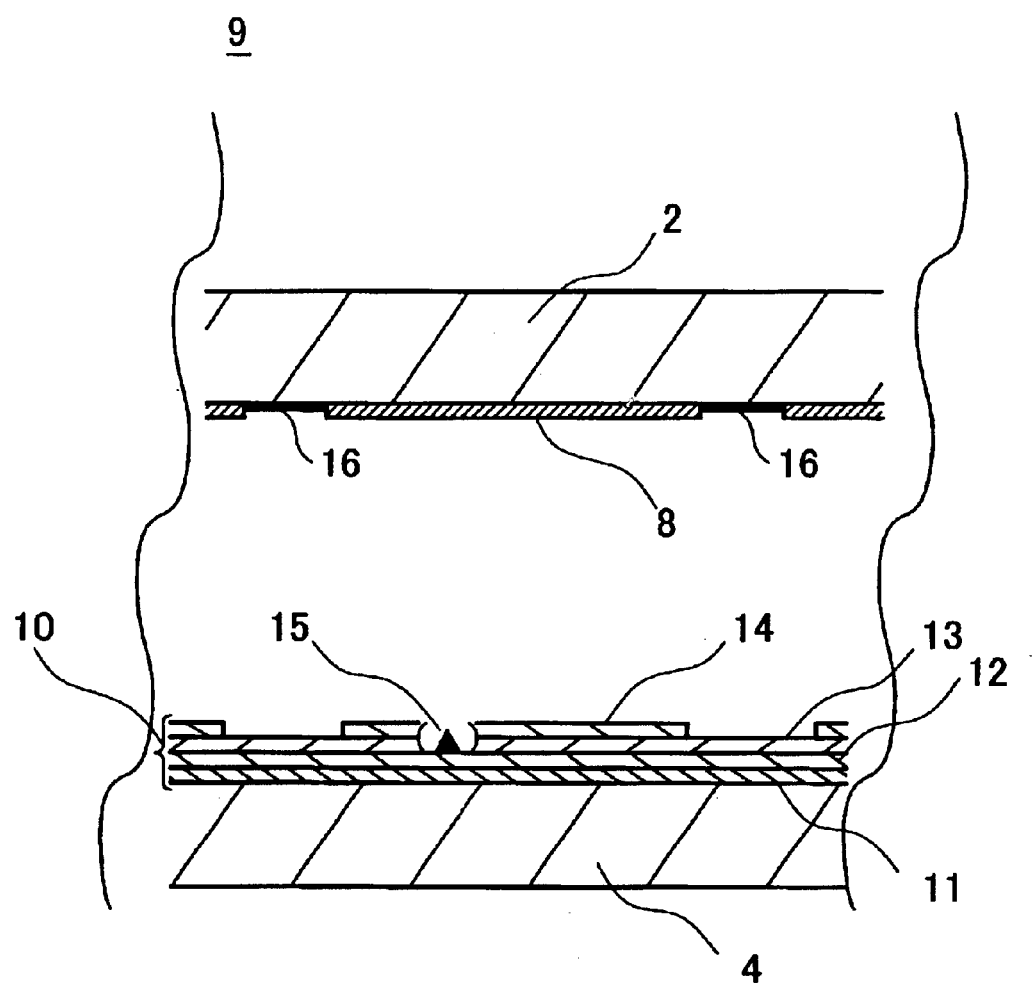
FIG. 5 is a schematic diagram showing a sectional structure of an essential part of a display with Spindt type electron source of the present invention.

FIG. 5 shows a section of an essential part of a display with Spindt type electron source of the present invention. A display 9 with Spindt type electron source has a faceplate 2, a Spindt type electron source 10 and a rear plate 4.

The Spindt type electron source 10 is formed by a cathode 11, a resistance layer 12, an insulator layer 13, a gate 14 and a spindt type electron emitter (such as Mo) 15. The faceplate 2 has, in its inside, a phosphor layer 8 onto which the ZnS: Ag, Al phosphor having the [Al]/[Ag] molar ratio x=2.0 obtained in First Embodiment is coated as a blue phosphor. The methods for forming the black conductive material 16, the phosphor layer 8 and the metal back are the same as Example 1. The brightness life according to the present invention is increased by 5% as compared with the prior art.

Example 12

Display 2 with Spindt Type Electron Source

FIG. 5 shows a section of an essential part of a display with Spindt type electron source of the present invention.

The faceplate 2 has, in its inside, the phosphor layer 8 onto which the ZnS: Ag, Al phosphor having the [Al]/[Ag] molar ratio x=4.5 obtained in First Embodiment is coated as a blue phosphor. The methods for forming the black conductive material 16, the phosphor layer 8 and the metal back are the same as Example 1. The brightness life according to the present invention is good, as in Example 11.

Example 13

Display 3 with Spindt Type Electron Source

FIG. 5 shows a section of an essential part of a display with Spindt type electron source of the present invention. The faceplate 2 has, in its inside, the phosphor layer 8 onto which the ZnS: Cu, Al phosphor having the [Al]/[Cu] molar ratio x=3.0 obtained by the same method as Second Embodiment is coated as a green phosphor. The methods for forming the black conductive material 16, the phosphor layer 8 and the metal back are the same as Example 1. The brightness life according to the present invention is good, as in Example 11.

Example 14

Display 4 with Spindt Type Electron Source

FIG. 5 shows a section of an essential part of a display with Spindt type electron source of the present invention. The faceplate 2 has, in its inside, the phosphor layer 8 onto which the ZnS: Cu, Al phosphor having the [Al]/[Cu] molar ratio x=5.0 obtained by the same method as Second Embodiment is coated as a green phosphor. The methods for forming the black conductive material 16, the phosphor layer 8 and the metal back are the same as Example 1. The brightness life according to the present invention is good, as in Example 11.

Example 15

Display 5 with Spindt Type Electron Source

FIG. 5 shows a section of an essential part of a display with Spindt type electron source of the present invention. The faceplate 2 has, in its inside, the phosphor layer 8 onto which the ZnS: Au, Al phosphor having the [Al]/[Au] molar ratio x=2.0 obtained in Third Embodiment is coated as a green phosphor. The methods for forming the black conductive material 16, the phosphor layer 8 and the metal back are the same as Example 1. The brightness life according to the present invention is good, as in Example 11.

Example 16

Display 6 with Spindt Type Electron Source

FIG. 5 shows a section of an essential part of a display with Spindt type electron source of the present invention. The faceplate 2 has, in its inside, the phosphor layer 8 onto which the ZnS: Cu, Ag, Al phosphor having the [Al]/([Cu]+[Ag]) molar ratio x=5.0 obtained by the same method as Fourth Embodiment is coated as a green phosphor. The methods for forming the black conductive material 16, the phosphor layer 8 and the metal back are the same as Example 1. The brightness life according to the present invention is good, as in Example 11.

Example 17

Display 7 with Spindt Type Electron Source

FIG. 5 shows a section of an essential part of a display with Spindt type electron source of the present invention.

The faceplate 2 has, in its inside, the phosphor layer 8 onto which the ZnS: Cu, Au, Al phosphor having the [Al]/([Cu]+[Au]) molar ratio x=5.0 obtained by the same method as Fifth Embodiment is coated as a green phosphor. The methods for forming the black conductive material 16, the phosphor layer 8 and the metal back are the same as Example 1. The brightness life according to the present invention is good, as in Example 11.

Example 18

Display 8 with Spindt Type Electron Source

FIG. 5 shows a section of an essential part of a display with Spindt type electron source of the present invention. The faceplate 2 has, in its inside, the phosphor layer 8 onto which the ZnS: Cu, Ag, Au, Al phosphor having the [Al]/([Cu]+[Ag]+[Au]) molar ratio x=5.0 obtained by the same method as Sixth Embodiment is coated as a green phosphor. The methods for forming the black conductive material 16, the phosphor layer 8 and the metal back are the same as Example 1. The brightness life according to the present invention is good, as in Example 11.

Example 19

Display 9 with Spindt Type Electron Source

FIG. 5 shows a section of an essential part of a display with Spindt type electron source of the present invention. The faceplate 2 has, in its inside, the phosphor layer 8 onto which the ZnS: Ag, Al phosphor having the [Al]/[Ag] molar ratio x=2.0 obtained in First Embodiment is coated as a blue phosphor, the ZnS: Cu, Al phosphor having the [Al]/[Cu] molar ratio x=4.0 obtained in Second Embodiment is coated as a green phosphor, and a $Y_2O_2S$: Eu phosphor is coated as a red phosphor.

A slurry method is used for coating of the phosphor layer 8. The phosphor is dispersed in a mixed solution of polyvinyl alcohol and dichromic acid to prepare a slurry suspension. The suspension is coated onto the faceplate and is dried for exposure via a mask to fix the phosphor. It is spray developed in hot pure water to wash away the unexposed part of the layer to form a pattern of the phosphor. The pattern forming of the phosphor is conducted for each of the colors.

The methods for forming the black conductive material 16 and the metal back are the same as Example 1. The brightness life according to the present invention is good, as in Example 11.

Example 20

Display 10 with Spindt Type Electron Source

FIG. 5 shows a section of an essential part of a display with Spindt type electron source of the present invention. The faceplate 2 has, in its inside, the phosphor layer 8 onto which a phosphor in which 4 weight % $In_2O_3$ is coated onto the surface of the ZnS: Cu, Al having the [Al]/[Cu] molar ratio x=3.5 obtained by the same method as Second Embodiment is coated as a green phosphor. The methods for forming the black conductive material 16, the phosphor layer 8 and the metal back are the same as Example 1. The brightness life according to the present invention is good, as in Example 11.

As described above in detail, the required object of the present invention can be achieved. In the field-emission display of the present invention, the concentration of Al as the coactivator of the phosphor is higher than that of M as the activator and the electrification characteristic is a positive charge. The lower resistance of the entire phosphor layer is made. The defect concentration of the surface of the phosphor is reduced for longer life.

What is claimed is:

1. A field-emission display having a faceplate formed with a phosphor layer and means irradiating an electron beam onto said phosphor layer, wherein said phosphor layer consists of a phosphor which is expressed by a general formula:

ZnS: M, Al where M is an activator of at least one of Cu, Ag and Au; and

Al is a coactivator, in which the concentration of Al is higher than that of M so that a surface electrification characteristic is a positive charge.

2. A field-emission display having a faceplate formed with a phosphor layer and means irradiating an electron beam onto said phosphor layer, wherein said phosphor layer consists of a ZnS: Ag, Al phosphor in which the concentration of a coactivator Al is higher than that of an activator Ag so that a surface electrification characteristic is a positive charge.

3. The display according to claim 2, further comprising said ZnS: Ag, Al phosphor in which the molar concentration ratio $x=[Al]/[Ag]$ of Al and Ag is $1.2 \leq x$.

4. A field-emission display having a faceplate formed with a phosphor layer and means irradiating an electron beam onto said phosphor layer, wherein said phosphor layer consists of a phosphor having a small defect peak of 320K of a thermal glow curve measured at a temperature rise of 0.1K/sec by excitation with a vacuum ultraviolet light of 168 nm, which is expressed by a general formula: ZnS: Ag, Al, in which the molar concentration ratio $x=[Al]/[Ag]$ of Al and Ag is $2.0 \leq x$.

5. A field-emission display having a faceplate formed with a phosphor layer and means irradiating an electron beam onto said phosphor layer, wherein said phosphor layer consists of a phosphor in which the volume increase of an Ag atom is volume compensated by an Al atom, the excess and shortage of the atomic volume is smaller than 0, which is expressed by a general formula: ZnS: Ag, Al, in which the molar concentration ratio $x=[Al]/[Ag]$ of Al and Ag is $4.5 \leq x$.

6. The display according to claim 1, wherein a light-transmitting conductive film including a light-transmitting conductive material is formed on the surface of said phosphor layer.

7. The display according to claim 1, wherein the light-transmitting conductive material is included in said phosphor layer.

8. The display according to claim 1, wherein the surface of a phosphor particle forming said phosphor layer is coated by the light-transmitting conductive film including the light-transmitting conductive material.

9. The display according to claim 8, wherein said light-transmitting conductive material is a metal oxide having any one of $In_2O_3$, MgO and $SnO_2$ as a main constituent.

* * * * *